(12) United States Patent
Yi et al.

(10) Patent No.: US 10,927,195 B2
(45) Date of Patent: Feb. 23, 2021

(54) OLEFIN COORDINATION POLYMERIZATION CATALYST AND USE THEREOF

(71) Applicant: PetroChina Company Limited, Beijing (CN)

(72) Inventors: Jianjun Yi, Beijing (CN); Mingge Zhang, Beijing (CN); Hongming Li, Beijing (CN); Tianxu Sun, Beijing (CN); Yuan Yuan, Beijing (CN); Yisen Wang, Beijing (CN); Qigu Huang, Beijing (CN); Runcong Zhang, Beijing (CN); Jing Wang, Beijing (CN); Yanpei Nie, Beijing (CN)

(73) Assignee: PetroChina Company Limited, Beijing (CN)

( * ) Notice: Subject to any disclaimer, the term of this patent is extended or adjusted under 35 U.S.C. 154(b) by 176 days.

(21) Appl. No.: 16/159,087

(22) Filed: Oct. 12, 2018

(65) Prior Publication Data
US 2019/0248928 A1 Aug. 15, 2019

(30) Foreign Application Priority Data
Feb. 11, 2018 (CN) .......................... 201810139701.1

(51) Int. Cl.
| | | |
|---|---|---|
| C08F 4/642 | (2006.01) | |
| C08F 4/656 | (2006.01) | |
| C08F 10/02 | (2006.01) | |
| B01J 31/12 | (2006.01) | |
| C08F 210/16 | (2006.01) | |
| B01J 37/04 | (2006.01) | |
| B01J 37/06 | (2006.01) | |
| C08F 10/06 | (2006.01) | |

(52) U.S. Cl.
CPC .......... *C08F 4/6421* (2013.01); *B01J 31/124* (2013.01); *B01J 37/04* (2013.01); *B01J 37/06* (2013.01); *C08F 4/6425* (2013.01); *C08F 4/6565* (2013.01); *C08F 10/02* (2013.01); *C08F 10/06* (2013.01); *C08F 210/16* (2013.01)

(58) Field of Classification Search
None
See application file for complete search history.

(56) References Cited

U.S. PATENT DOCUMENTS

| | | |
|---|---|---|
| 4,861,847 A | 8/1989 | Mao et al. |
| 2002/0082160 A1 | 6/2002 | Yashiki et al. |
| 2004/0082740 A1 | 4/2004 | Gray et al. |
| 2006/0217261 A1 | 9/2006 | Morini et al. |
| 2019/0048106 A1 | 2/2019 | Zhang et al. |

FOREIGN PATENT DOCUMENTS

| | | | | |
|---|---|---|---|---|
| CN | 85100997 A | 1/1987 | | |
| CN | 1140722 A | 1/1997 | | |
| CN | 1771266 A | 5/2006 | | |
| CN | 1803864 A | 7/2006 | | |
| CN | 101125897 A | 2/2008 | | |
| CN | 101215344 A | 7/2008 | | |
| CN | 101353385 | 1/2009 | | |
| CN | 101407561 | 4/2009 | | |
| CN | 101456924 | 6/2009 | | |
| CN | 101891849 A | 11/2010 | | |
| CN | 101906180 A | 12/2010 | | |
| CN | 102492061 | 6/2012 | | |
| CN | 102558404 A | 7/2012 | | |
| CN | 102911299 | 2/2013 | | |
| CN | 103073662 | 5/2013 | | |
| CN | 103613690 | 3/2014 | | |
| CN | 104211844 A | 12/2014 | | |
| CN | 104710549 A | 6/2015 | | |
| CN | 104829758 A | 8/2015 | | |
| CN | 105384854 A | 3/2016 | | |
| CN | 105622799 A | * | 6/2016 | .............. C08F 10/00 |
| CN | 106519084 | 3/2017 | | |
| EP | 1108728 A1 | 6/2001 | | |

(Continued)

OTHER PUBLICATIONS

CN 105622799 A, Machine-generated English translation (Year: 2016).*

Werle, P., et al., Identification of By-Products in Pentaerythritol Process Liquors,, Liebigs Annalen der Chemie, 1985(5): 1082-1087 (May 13, 1985).

International Preliminary Report on Patentability for International Application No. PCT/CN2017/074498 "Olefin Coordination Polymerization Catalyst, and Preparation Method and Application Thereof", dated Nov. 6, 2018.

International Search Report for International Application No. PCT/CN2017/074498 "Olefin Coordination Polymerization Catalyst, and Preparation Method and Application Thereof", dated May 26, 2017.

(Continued)

*Primary Examiner* — Yun Qian

(74) *Attorney, Agent, or Firm* — Hamilton, Brook, Smith & Reynolds, P.C.

(57) ABSTRACT

The present invention provides an olefin coordination polymerization catalyst and use thereof. The composition of the raw materials of the olefin coordination polymerization catalyst comprises: a main catalyst and a cocatalyst, wherein a molar ratio of the transition metal halide in the main catalyst to the cocatalyst is 1:10-500; and the composition of the raw materials of the main catalyst comprises a magnesium compound, a transition metal halide, an alcohol having 2 to 15 carbon atoms, and a star-shaped organosiloxane compound in a molar ratio of 1:1-40:0.01-10:0.001-10; and the cocatalyst comprises an organoaluminum compound. The above olefin coordination polymerization catalyst is used as a catalyst for ethylene polymerization, propylene polymerization, and copolymerization of ethylene or propylene with an α-olefin. The olefin polymerization catalyst of the present invention has good catalytic activity.

13 Claims, No Drawings

(56) References Cited

FOREIGN PATENT DOCUMENTS

JP         2013095768 A     5/2013

OTHER PUBLICATIONS

Non-Final Office Action for U.S. Appl. No. 16/161,894, "Olefin Coordination Polymerization Catalyst, and Preparation Method and Application Thereof" dated Jun. 18, 2020.

* cited by examiner

__US 10,927,195 B2__

OLEFIN COORDINATION POLYMERIZATION CATALYST AND USE THEREOF

RELATED APPLICATION

This application claims priority under 35 U.S.C. § 119 or 365 to Chinese Application No. 201810139701.1, filed Feb. 11, 2018. The entire teachings of the above application are incorporated herein by reference.

FIELD OF THE INVENTION

The present invention relates to a catalyst, in particular to an olefin coordination polymerization catalyst, which belongs to the technical field of catalysts.

BACKGROUND

Olefin polymerization catalysts are the essence of olefin polymerization technology. From the perspective of development of olefin polymerization catalysts, there are two main requirements of: (1) developing polyolefin resin catalysts capable of achieving special performance or having superior properties, such as metallocene catalysts and non-metallocene late transition metal catalysts; (2) with regard to the production of general polyolefin resins, on the basis of the further improvement in catalyst performance, simplifying the catalyst preparation process, lowering the cost of the catalyst, and developing environmentally friendly technology, thereby increasing efficiency and competitiveness.

Before the 1980s, researches on polyethylene catalysts were focused on the efficiency of the catalyst. With the efforts made in nearly 30 years, the catalytic efficiency of polyethylene catalysts has been increased by orders of magnitude, which simplifies the production process of polyolefins and reduces energy consumption and material consumption.

Ziegler-Natta (Z-N) catalysts have been discovered for nearly 60 years. Although polyolefin catalysts such as metallocene and non-metallocene emerged during that period, many industrialization problems including expensive cocatalysts and difficulties in main catalyst loading and the like were still present. Therefore, in terms of current industrial production and market share, traditional Z—N catalysts will remain dominant in the field of olefin polymerization in the near future.

In recent years, countless Z—N catalyst products have emerged domestically and overseas, with the catalyst stability and polymerization catalytic activity continuously increasing. However, there are still drawbacks in terms of hydrogen sensitivity, control of catalyst particle regularity and particle size distribution. At present, it is necessary to develop a spherical or spheroidal catalyst with a simple preparation process, good hydrogen regulation sensitivity, and uniform particle size distribution.

Chinese Patent Application No. 96106647.4X discloses an olefin polymerization catalyst and a preparation method thereof. The carrier $MgCl_2$ is dissolved in a mixture of an alcohol and an alkane to form a liquid $MgCl_2$ alcohol adduct, which is brought into contact with $TiCl_4$ to give an olefin polymerization catalyst. However, the hydrogenation performance of the resultant catalyst is poor, and the melt index MFR of the polyethylene can be adjusted only within the range of 0.1 g/10 min to 220 g/10 min.

Chinese Patent Application No. 200480008242.X discloses an olefin polymerization catalyst and a preparation method thereof. The carrier $MgCl_2$ is directly dissolved in ethanol to prepare a solid $MgCl_2$ alcohol adduct, and $TiCl_4$ is loaded on the solid $MgCl_2$ alcohol adduct to obtain an olefin polymerization catalyst. However, the preparation process of this method is complicated.

Chinese Patent Application No. 201110382706.5 discloses an olefin polymerization catalyst and a preparation method thereof. The carrier $MgCl_2$ is dissolved in an organic solvent of isooctanol and ethanol to prepare a solid $MgCl_2$ alcoholate, and then $TiCl_4$ is loaded on the solid $MgCl_2$ alcoholate to obtain an olefin polymerization catalyst, which has good hydrogen sensitivity. However, the catalyst activity is low and the main catalyst particles tend to adhere onto the walls of the container.

Chinese Patent Applications No. 85100997, 200810227369.0, 200810227371.8, and 200810223088.8 disclose an olefin polymerization catalyst and a preparation method thereof. $MgCl_2$ particles are dissolved in a system of an organic epoxy compound, an organic phosphorus compound and an inert organic solvent to obtain a $MgCl_2$ solution, which is brought into contact with $TiCl_4$ to prepare a main catalyst for olefin polymerization. The organophosphorus compound functions as an essential component in a solvent system in which $MgCl_2$ particles are dissolved. However, the preparation process of this method is complicated.

Chinese Patent Application No. 2013105985560 discloses a process for preparing a catalyst in which an inert organic solvent, a monohydric alcohol having a carbon number of less than 5, and an alcohol having a carbon number of more than 5 are added, and after dissolution of the $MgCl_2$ particles, an organophosphorus compound, an organosilicon compound and an organoboron compound are further added to prepare a liquid $MgCl_2$ alcoholate; $TiCl_4$ is brought into contact with the liquid $MgCl_2$ alcoholate, and then a polyhydroxy solid is added to obtain an olefin polymerization catalyst. The particle morphology of the solid main catalyst, the hydrogen sensitivity of the catalyst catalyzed olefin polymerization, and the bulk density of the polyolefin can be improved.

Chinese Patent Application No. 201310034134 discloses a process for preparing a catalyst in which an inert organic solvent, an alcohol having a carbon number of less than 5, and an alcohol having a carbon number of more than 5 are added, and after dissolution of the $MgCl_2$ particles, an organophosphorus compound and an organosilicon compound are further added to prepare a liquid $MgCl_2$ alcoholate; $TiCl_4$ is brought into contact with the liquid $MgCl_2$ alcoholate, and then a polyhydroxy solid is added to obtain a high-efficiency olefin polymerization catalyst. The particle morphology of the solid main catalyst and the hydrogen sensitivity of the catalyst catalyzed olefin polymerization can be improved. However, there is room for improvement in hydrogen sensitivity of this method.

Chinese Patent Application No. 201210436136.8 discloses a process for preparing a catalyst in which an inert organic solvent, an alcohol having a carbon number of less than 5, and an alcohol having a carbon number of more than 5 are added, and after dissolution of the $MgCl_2$ particles are dissolved, an organophosphorus compound and an organosilicon compound are further added to prepare a liquid $MgCl_2$ alcoholate; $TiCl_4$ is brought into contact with the liquid $MgCl_2$ alcoholate to obtain a high-efficiency olefin polymerization catalyst. The particle morphology of the solid main catalyst and the hydrogen sensitivity of the catalyst catalyzed olefin polymerization can be improved. However, there is room for improvement in hydrogen sensitivity of this method.

In summary, there is a pressing need in the art to solve the technical problem to provide an olefin polymerization catalyst with improved performance in hydrogen sensitivity of the catalyst in catalytic olefin polymerization as well as good particle morphology and uniform particle size distribution.

SUMMARY

In order to solve the above technical problem, an object of the present invention is to provide an olefin coordination polymerization catalyst having good catalytic activity.

In order to achieve the above technical effect, the present invention provides an olefin coordination polymerization catalyst, and the composition of the raw materials of the olefin coordination polymerization catalyst comprises: a main catalyst and a cocatalyst, wherein a molar ratio of the transition metal halide in the main catalyst to the cocatalyst is 1:10-500;

the composition of the raw materials of the main catalyst comprises a magnesium compound, a transition metal halide, an alcohol having 2 to 15 carbon atoms, and a star-shaped organosiloxane compound in a molar ratio of 1:1-40:0.01-10:0.001-10;

the cocatalyst comprises an organoaluminum compound;

the star-shaped organosiloxane compound is at least one selected from the group consisting of the compounds of the formula (I):

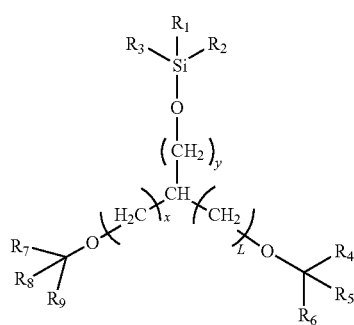

Formula (I)

wherein y, x and L are integers selected from 0, 1-15;

M is selected from Si or C;

$R_1$, $R_2$, and $R_3$ are organic groups, present simultaneously or not simultaneously, selected from the group consisting of H, $C_1$-$C_{20}$ aliphatic hydrocarbyl, $C_1$-$C_{20}$ alkoxy, $C_3$-$C_{20}$ alicyclic group, $C_3$-$C_{20}$ alicyclic alkoxy, $C_6$-$C_{20}$ aryloxy, or $C_6$-$C_{20}$ aromatic hydrocarbyl;

$R_4$, $R_5$, and $R_6$ are organic groups, present simultaneously or not simultaneously, selected from the group consisting of H, $C_1$-$C_{20}$ aliphatic hydrocarbyl, $C_1$-$C_{20}$ alkoxy, $C_3$-$C_{20}$ alicyclic group, $C_3$-$C_{20}$ alicyclic alkoxy, $C_6$-$C_{20}$ aryloxy, or $C_6$-$C_{20}$ aromatic hydrocarbyl;

$R_7$, $R_8$, and $R_9$ are organic groups, present simultaneously or not simultaneously, selected from the group consisting of H, $C_1$-$C_{20}$ aliphatic hydrocarbyl, $C_1$-$C_{20}$ alkoxy, $C_3$-$C_{20}$ alicyclic group, $C_3$-$C_{20}$ alicyclic alkoxy, $C_6$-$C_{20}$ aryloxy, or $C_6$-$C_{20}$ aromatic hydrocarbyl.

The star-shaped organic ether compound used in the olefin coordination polymerization catalyst of the present invention is a compound of a star-like structure having three or more chains (arms), each of which is not distinguished as a main chain or a branch, formed by chemical bonding at the same site (the core).

When the olefin coordination polymerization catalyst provided by the present invention is specifically used for catalysis, the goal of the catalysis is achieved once the main catalyst and the cocatalyst are added into the catalytic reaction.

In the olefin coordination polymerization catalyst of the present invention, preferably, the star-shaped organosiloxane compound is at least one selected from the group consisting of the compounds represented by the following structural formulae:

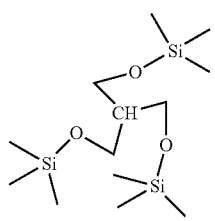

1

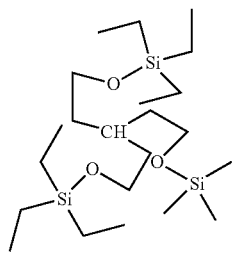

2

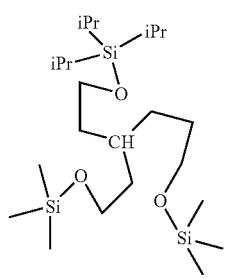

3

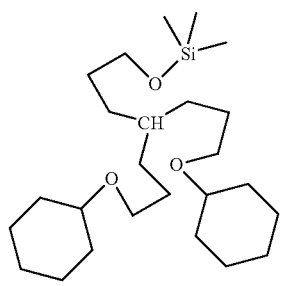

4

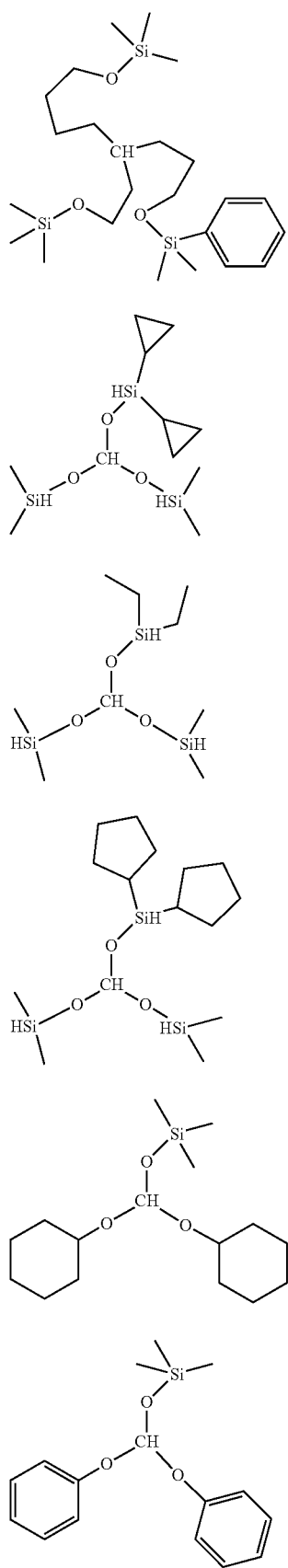
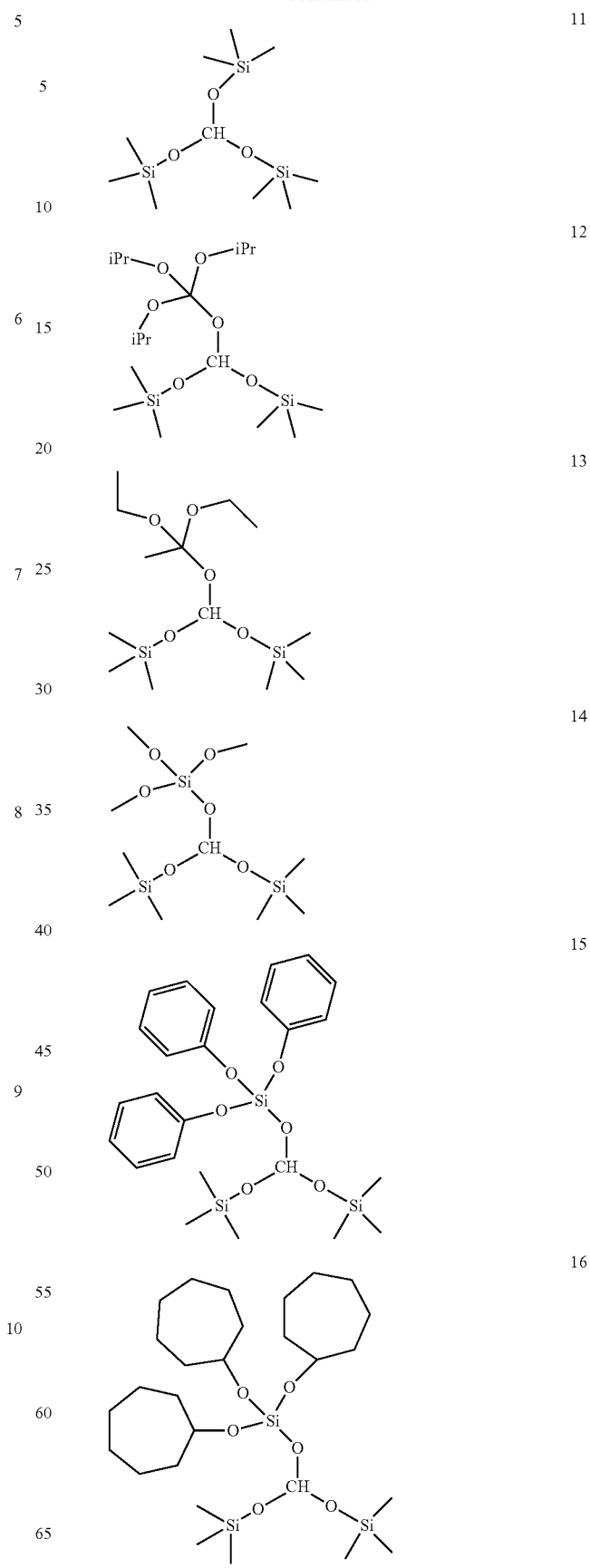

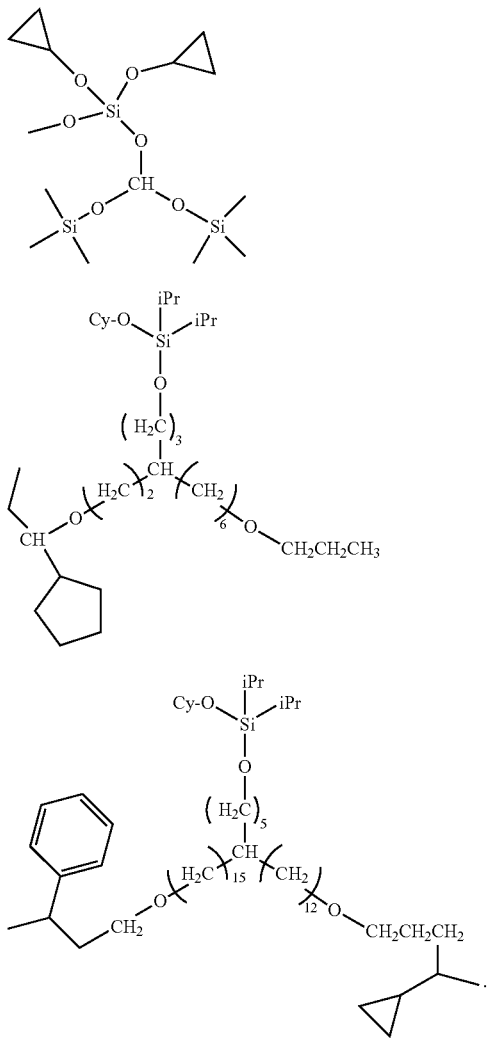

In the olefin coordination polymerization catalyst provided by the present invention, iPr in Structural Formula 1-19 represents isopropyl.

In the olefin coordination polymerization catalyst provided by the present invention, when the star-shaped organosiloxane compound used is a combination of a plurality of substances, they may be mixed in any ratio.

In the olefin coordination polymerization catalyst of the present invention, preferably, the magnesium compound used is at least one selected from the group consisting of the compounds of formula $Mg(R)_aX_b$, wherein R is selected from the group consisting of $C_1$-$C_{20}$ aliphatic hydrocarbyl, $C_1$-$C_{20}$ aliphatic alkoxy, $C_3$-$C_{20}$ alicyclic group, or $C_6$-$C_{20}$ aromatic hydrocarbyl; X is selected from halogen; a=0, 1 or 2; b=0, 1 or 2, and a+b=2.

In the olefin coordination polymerization catalyst of the present invention, preferably, the magnesium compound used comprises at least one selected from the group consisting of magnesium dichloride, magnesium dibromide, magnesium diiodide, magnesium methoxide chloride, magnesium ethoxide chloride, magnesium propoxide chloride, magnesium butoxide chloride, magnesium phenoxide chloride, magnesium ethoxide, magnesium isopropoxide, magnesium butoxide, magnesium isopropoxide chloride, butyl magnesium chloride, magnesium diethoxide, magnesium dipropoxide, and magnesium dibutoxide; more preferably, the magnesium compound used is magnesium dichloride, magnesium diethoxide, or magnesium dipropoxide.

In the olefin coordination polymerization catalyst of the present invention, when the magnesium compound is a combination of a plurality of substances, they may be mixed in any ratio.

In the olefin coordination polymerization catalyst of the present invention, preferably, the transition metal halide used is at least one selected from the group consisting of the compounds of formula $M(R^1)_{4-m}X_m$;

wherein M is Ti, Zr, Hf, Fe, Co or Ni; X is Cl, Br, or F; m is an integer from 1 to 4;

$R^1$ is selected from the group consisting of $C_1$-$C_{20}$ aliphatic hydrocarbyl, $C_1$-$C_{20}$ aliphatic alkoxy, $C_1$-$C_{20}$ cyclopentadienyl group and a derivative thereof, $C_1$-$C_{20}$ aromatic hydrocarbyl, COR' or COOR', wherein R' is an aliphatic hydrocarbyl having $C_1$-$C_{10}$ or an aromatic group having $C_1$-$C_{10}$.

In the olefin coordination polymerization catalyst of the present invention, preferably, $R^1$ includes methyl, ethyl, propyl, butyl, pentyl, hexyl, heptyl, octyl, nonyl, decyl, isobutyl, tert-butyl, isopentyl, tert-pentyl, 2-ethylhexyl, phenyl, naphthyl, o-methylphenyl, m-methylphenyl, p-methylphenyl, o-sulfonylphenyl, formyl, acetyl, or benzoyl.

In the olefin coordination polymerization catalyst of the present invention, preferably, the transition metal halide is one or a combination of more than one of titanium tetrachloride, titanium tetrabromide, titanium tetraiodide, titanium tetrabutoxide, titanium tetraethoxide, titanium monochloride triethoxide, titanium dichloride diethoxide, titanium trichloride ethoxide, n-butyl titanate, isopropyl titanate, titanium methoxide trichloride, titanium dibutoxide dichloride, titanium tributoxide chloride, titanium tetraphenoxide, titanium monochloride triphenoxide, titanium dichloride diphenoxide and titanium trichloride monophenoxide.

In the olefin coordination polymerization catalyst of the present invention, when the transition metal halide is used as a combination of a plurality of substances, they may be mixed in any ratio.

In the olefin coordination polymerization catalyst of the present invention, more preferably, the transition metal halide used is titanium tetrachloride.

In the olefin coordination polymerization catalyst of the present invention, preferably, a molar ratio of the transition metal halide to the magnesium compound is 8-40:1.

In the olefin coordination polymerization catalyst of the present invention, preferably, the alcohol having 2 to 15 carbon atoms used is at least one selected from the group consisting of ethanol, methanol, propanol, butanol, pentanol, heptanol, isooctanol, n-octanol, nonanol, decanol, undecanol, dodecanol, tridecanol, tetradecanol, and pentadecanol. When the alcohol having 2 to 15 carbon atoms is used as a combination of a plurality of substances, they may be mixed in any ratio.

In the olefin coordination polymerization catalyst of the present invention, more preferably, the alcohol having 2 to 15 carbon atoms used includes ethanol and/or isooctanol.

In the olefin coordination polymerization catalyst of the present invention, preferably, the cocatalyst used includes triethyl aluminum, triisobutyl aluminum, tri-n-hexyl aluminum, monochlorodiethylaluminum, or methylaluminoxane (MAO).

In the olefin coordination polymerization catalyst of the present invention, preferably, the main catalyst of the olefin coordination polymerization catalyst is prepared according to the following steps:

the magnesium compound is dispersed in an inert organic solvent, into which an alcohol having 2-15 carbon atoms is added, and stirred at 90° C. to 150° C. for 1 h-5 h;

the temperature is lowered to 30° C. to 80° C., and the star-shaped organosiloxane compound is added, and a reaction is carried out for 0.5 h-3 h to obtain a mixture;

the mixture is brought into contact with the transition metal halide at −25° C. to 30° C., reacted at −25° C. to 30° C. for 0.5 h-5 h, heated to 50° C. to 120° C. in 2 h-8 h, and reacted for 0.5 h-5 h;

the product is washed with toluene or n-hexane, filtered, and dried under vacuum at 40° C. to 90° C. for 0.5 h-5 h to obtain the main catalyst of the olefin coordination polymerization catalyst.

In the method for preparing the main catalyst of the olefin coordination polymerization catalyst of the present invention, preferably, the inert organic solvent used is selected from $C_5$-$C_{15}$ saturated hydrocarbon, $C_5$-$C_{10}$ alicyclic hydrocarbon or $C_6$-$C_{15}$ aromatic hydrocarbon.

More preferably, the inert organic solvent used is one or a combination of several selected from decane, octane, dodecane, toluene, xylene, hexane, heptane and cyclohexane.

In the method for preparing the main catalyst of the olefin coordination polymerization catalyst of the present invention, when the inert organic solvent is used by mixing a plurality of materials, they may be mixed in any ratio.

In the method for preparing the main catalyst of the olefin coordination polymerization catalyst of the present invention, preferably, it is dried under vacuum for 1 h-4 h.

The main catalyst of the olefin coordination polymerization catalyst prepared by the method for preparing the main catalyst of the olefin coordination polymerization catalyst of the present invention has a uniform spherical shape.

The above olefin coordination polymerization catalyst of the present invention is used for catalyzing olefin coordination polymerization, and the olefin coordination polymerization catalyst can be used as a catalyst for ethylene polymerization, propylene polymerization, and copolymerization of ethylene or propylene with an α-olefin; wherein the α-olefin is selected from $C_3$-$C_{20}$ olefins.

Preferably, the α-olefin is selected from the group consisting of propylene, 1-butene, 1-hexene, 1-octene, 1-decene, 3-methyl-1-butene, cyclopentene, 4-methyl-1-pentene, 1,3-butadiene, isoprene, styrene, methylstyrene, and norbornene.

When the olefin coordination polymerization catalyst of the present invention is used for catalyzing olefin coordination polymerization, the main catalyst and the cocatalyst may be added to the catalytic reaction separately.

In the above olefin coordination polymerization catalyst of the present invention, the addition of the star-shaped organosiloxane compound as an electron donor can significantly improve the catalytic activity, hydrogen sensitivity and copolymerization capacity of the catalyst, and improve the morphology of the catalyst particles.

For the olefin coordination polymerization catalyst of the present invention, the addition of an alcohol having 2 to 15 carbon atoms can significantly improve the hydrogen sensitivity of the catalyst.

In the method for preparing the main catalyst of the olefin coordination polymerization catalyst of the present invention, after the magnesium halide carrier is dissolved and the star-shaped organosiloxane compound is subsequently added, the catalytic activity of the catalyst can be significantly improved, electrostatic charges on the solid particles of the main catalyst can be eliminated, and the main catalyst particles may not adhere onto the walls of the container.

The preparation process of the main catalyst of the olefin coordination polymerization catalyst of the present invention is simple, has low requirements on equipment, low energy consumption, little environmental pollution, improves the particle morphology of the solid main catalyst and the hydrogen sensitivity of the catalyst for catalytic olefin polymerization.

The olefin coordination polymerization catalyst of the present invention is suitable for use in a slurry polymerization process, a loop polymerization process, a gas phase polymerization process or a combined polymerization process.

The olefin coordination polymerization catalyst of the present invention is excellent in hydrogen sensitivity, and the melt index MFR of polyethylene is adjusted within the range of 0.01 g/10 min to 550 g/10 min.

The olefin coordination polymerization catalyst of the present invention has good particle morphology and a spherical shape; with uniform particle size distribution and high bulk density; less fine powder and high activity.

DETAILED DESCRIPTION

For better understanding of the technical features, objects and advantageous effects of the present invention, the technical solutions of the present invention will now be described in detail below, which are not to be construed as limiting to the scope of the present invention.

The mass percentages of Mg and Ti in the main catalyst were measured by ICP.

The melt index of the polyethylene and polyethylene copolymer was measured under the conditions of a testing load of 5 kg and a temperature of 190° C.

The melting index MFR of the isotactic polypropylene was measured under a testing load of 2.16 kg and a temperature of 230° C.

Example 1

This example provides a method for preparing a main catalyst of an olefin coordination polymerization catalyst, which specifically comprises the following steps:

In a reactor sufficiently purged with nitrogen, 1 g of magnesium dichloride, 20 mL of n-decane, 0.25 mL of ethanol, and 6 mL of isooctanol were added, and the mixture was stirred, heated to 120° C., and reacted for 2 h. The temperature was lowered to 60° C., and 1.2 g of a star-shaped organosiloxane compound (Structural Formula 1) was subsequently added, and the reaction was carried out for 2 h with the temperature kept at 60° C. The temperature was lowered to −15° C., 20 mL of titanium tetrachloride was added dropwise, the reaction was carried out for 1 h, then the temperature was raised to 100° C., and the reaction was carried out for 2 h. Stirring was stopped, and the reaction mixture was allowed to stand, separated in layers, filtered, washed four times with hexane (30 ml each time), and dried under vacuum at 70° C. for 2 h to obtain a powdery solid main catalyst in a spherical shape with good fluidity, non-stickiness to the walls of the container, and uniform particle size distribution.

Example 2

This example provides a method for preparing a main catalyst of an olefin coordination polymerization catalyst, which specifically comprises the following steps:

In a reactor sufficiently purged with nitrogen, 1 g of magnesium dichloride, 30 mL of n-decane, 0.3 mL of ethanol, and 6.5 mL of isooctanol were added, and the mixture was stirred, heated to 120° C., and reacted for 2 h. The temperature was lowered to 60° C., and 2.5 g of a star-shaped organosiloxane compound (Structural Formula 2) was subsequently added, and the reaction was carried out for 2 h with the temperature kept at 60° C. The temperature was lowered to −10° C., 30 mL of titanium tetrachloride was added dropwise, the reaction was carried out for 1 h, then the temperature was raised to 110° C., and the reaction was carried out for 3 h. Stirring was stopped, and the reaction mixture was allowed to stand, separated in layers, filtered, washed four times with hexane (30 ml each time), and dried under vacuum at 60° C. for 3 h to obtain a powdery solid main catalyst in a spherical shape with good fluidity, non-stickiness to the walls of the container, and uniform particle size distribution.

Example 3

This example provides a method for preparing a main catalyst of an olefin coordination polymerization catalyst, which specifically comprises the following steps:

In a reactor sufficiently purged with nitrogen, 1 g of magnesium dichloride, 30 mL of n-decane, 0.25 mL of ethanol, and 7.5 mL of isooctanol were added, and the mixture was stirred, heated to 110° C., and reacted for 2 h. The temperature was lowered to 50° C., and 2 g of a star-shaped organosiloxane compound (Structural Formula 3) was subsequently added, the temperature was raised to 80° C., and the reaction was carried out for 2 h. The temperature was lowered to −15° C., 30 mL of titanium tetrachloride was added dropwise, the reaction was carried out for 1 h, then the temperature was raised to 65° C., and the reaction was carried out for 2 h. Stirring was stopped, and the reaction mixture was allowed to stand, separated in layers, filtered, washed four times with hexane (30 ml each time), and dried under vacuum at 50° C. for 4 h to obtain a powdery solid main catalyst in a spherical shape with good fluidity, non-stickiness to the walls of the container, and uniform particle size distribution.

Example 4

This example provides a method for preparing a main catalyst of an olefin coordination polymerization catalyst, which specifically comprises the following steps:

In a reactor sufficiently purged with nitrogen, 1 g of magnesium dichloride, 20 mL of n-decane, 2 mL of ethanol, and 7 mL of isooctanol were added, and the mixture was stirred, heated to 110° C., and reacted for 4 h. The temperature was lowered to 60° C., and 0.85 g of a star-shaped organosiloxane compound (Structural Formula 4) was subsequently added, the temperature was raised to 100° C., and the reaction was carried out for 2 h. The temperature was lowered to −15° C., 25 mL of titanium tetrachloride was added dropwise, the reaction was carried out for 1 h, then the temperature was raised to 100° C., and the reaction was carried out for 2 h. Stirring was stopped, and the reaction mixture was allowed to stand, separated in layers, filtered, washed four times with hexane (30 ml each time), and dried under vacuum at 80° C. for 2 h to obtain a powdery solid main catalyst in a spherical shape with good fluidity, non-stickiness to the walls of the container, and uniform particle size distribution.

Example 5

This example provides a method for preparing a main catalyst of an olefin coordination polymerization catalyst, which specifically comprises the following steps:

In a reactor sufficiently purged with nitrogen, 1 g of magnesium dichloride, 20 mL of n-decane, 0.4 mL of ethanol, and 8 mL of isooctanol were added, and the mixture was stirred, heated to 100° C., and reacted for 5 h. The temperature was lowered to 40° C., and 2 g of a star-shaped organosiloxane compound (Structural Formula 5) was subsequently added, and the reaction was carried out for 2 h with the temperature kept at 50° C. The temperature was lowered to −15° C., 35 mL of titanium tetrachloride was added dropwise, the reaction was carried out for 3 h, then the temperature was raised to 120° C., and the reaction was carried out for 2 h. Stirring was stopped, and the reaction mixture was allowed to stand, separated in layers, filtered, washed four times with hexane (30 ml each time), and dried under vacuum at 90° C. for 2 h to obtain a powdery solid main catalyst in a spherical shape with good fluidity, non-stickiness to the walls of the container, and uniform particle size distribution.

Example 6

This example provides a method for preparing a main catalyst of an olefin coordination polymerization catalyst, which specifically comprises the following steps:

In a reactor sufficiently purged with nitrogen, 1 g of magnesium dichloride, 20 mL of n-decane, 2.5 mL of ethanol, and 2 mL of isooctanol were added, and the mixture was stirred, heated to 120° C., and reacted for 2 h. The temperature was lowered to 60° C., and 3 g of a star-shaped organosiloxane compound (Structural Formula 6) and 6 mL of tetraethoxysilane were subsequently added, and the reaction was carried out for 3 h with the temperature kept at 60° C. The temperature was lowered to −15° C., 40 mL of titanium tetrachloride was added dropwise, the reaction was carried out for 1 h, then the temperature was raised to 70° C., and the reaction was carried out for 2 h. Stirring was stopped, and the reaction mixture was allowed to stand, separated in layers, filtered, washed four times with hexane (30 ml each time), and dried under vacuum at 80° C. for 2 h to obtain a powdery solid main catalyst in a spherical shape with good fluidity, non-stickiness to the walls of the container, and uniform particle size distribution.

Example 7

This example provides a method for preparing a main catalyst of an olefin coordination polymerization catalyst, which specifically comprises the following steps:

In a reactor sufficiently purged with nitrogen, 1 g of magnesium dichloride, 30 mL of n-decane, and 0.25 mL of ethanol were added, and the mixture was stirred, heated to 120° C., and reacted for 4 h. The temperature was lowered to 50° C., and 2 g of a star-shaped organosiloxane compound (Structural Formula 7) and 0.4 mL of ethanol were added, and the reaction was carried out for 4 h with the temperature kept at 60° C. The temperature was lowered to −15° C., 35 mL of titanium tetrachloride was added dropwise, the reaction was carried out for 1 h, then the temperature was raised to 90° C., and the reaction was carried out for 4 h. Stirring was stopped, and the reaction mixture was allowed to stand, separated in layers, filtered, washed twice with toluene (30 ml each time) and four times with hexane (30 ml each time), and dried under vacuum at 60° C. for 4 h to obtain a powdery solid main catalyst in a spherical shape with good fluidity, non-stickiness to the walls of the container, and uniform particle size distribution.

Example 8

This example provides a method for preparing a main catalyst of an olefin coordination polymerization catalyst, which specifically comprises the following steps:

In a reactor sufficiently purged with nitrogen, 1 g of magnesium dichloride, 20 mL of dodecane, 0.4 mL of ethanol, and 6 mL of decanol were added, and the mixture was stirred, heated to 100° C., and reacted for 2 h. The temperature was lowered to 70° C., and 2 g of a star-shaped organosiloxane compound (Structural Formula 8) was subsequently added, and the reaction was carried out for 3 h with the temperature kept at 70° C. The temperature was lowered to −10° C., 30 mL of titanium tetrachloride was added dropwise, the reaction was carried out for 1 h, then the temperature was raised to 100° C., and the reaction was carried out for 3 h. Stirring was stopped, and the reaction mixture was allowed to stand, separated in layers, filtered, washed four times with hexane (30 ml each time), and dried under vacuum at 60° C. for 4 h to obtain a powdery solid main catalyst in a spherical shape with good fluidity, non-stickiness to the walls of the container, and uniform particle size distribution.

Example 9

This example provides a method for preparing a main catalyst of an olefin coordination polymerization catalyst, which specifically comprises the following steps:

In a reactor sufficiently purged with nitrogen, 1 g of magnesium dichloride, 30 mL of toluene, and 0.2 mL of propanol were added, and the mixture was stirred, heated to 120° C., and reacted for 5 h. The temperature was lowered to 50° C., and 1.5 g of a star-shaped organosiloxane compound (Structural Formula 9) was added, and the reaction was carried out for 2 h with the temperature kept at 50° C. The temperature was lowered to 0° C., 25 mL of titanium tetrachloride was added dropwise, the reaction was carried out for 1 h, then the temperature was raised to 120° C., and the reaction was carried out for 2 h. Stirring was stopped, and the reaction mixture was allowed to stand, separated in layers, filtered, washed twice with hexane (30 ml each time), and dried under vacuum at 80° C. for 2 h to obtain a powdery solid main catalyst in a spherical shape with good fluidity, non-stickiness to the walls of the container, and uniform particle size distribution.

Example 10

This example provides a method for preparing a main catalyst of an olefin coordination polymerization catalyst, which specifically comprises the following steps:

In a reactor sufficiently purged with nitrogen, 1 g of magnesium dichloride, 30 mL of n-octane, 2.5 mL of butanol, and 7 mL of isooctanol were added, and the mixture was stirred, heated to 100° C., and reacted for 2 h. The temperature was lowered to 60° C., and 2 g of a star-shaped organosiloxane compound (Structural Formula 10) was added, and the reaction was carried out for 2 h with the temperature kept at 60° C. The temperature was lowered to −15° C., 40 mL of titanium tetrachloride was added dropwise, the reaction was carried out for 1 h, then the temperature was raised to 90° C., and the reaction was carried out for 2 h. Stirring was stopped, and the reaction mixture was allowed to stand, separated in layers, filtered, washed four times with hexane (30 ml each time), and dried under vacuum at 60° C. for 2 h to obtain a powdery solid main catalyst in a spherical shape with good fluidity, non-stickiness to the walls of the container, and uniform particle size distribution.

Example 11

This example provides a method for preparing a main catalyst of an olefin coordination polymerization catalyst, which specifically comprises the following steps:

In a reactor sufficiently purged with nitrogen, 1 g of magnesium dichloride, 25 mL of n-decane, and 5 mL of ethanol were added, and the mixture was stirred, heated to 120° C., and reacted for 2 h. The temperature was lowered to 50° C., and 1.5 g of a star-shaped organosiloxane compound (Structural Formula 11) was added, and the reaction was carried out for 2 h with the temperature kept at 50° C. The temperature was lowered to 25° C., 25 mL of titanium tetrachloride at −10° C. was then added dropwise, the reaction was carried out for 1 h at 0° C., then the temperature was raised to 110° C. in 2 h, and the reaction was carried out for 2 h. Stirring was stopped, and the reaction mixture was allowed to stand, separated in layers, filtered, washed four times with hexane (30 ml each time), and dried under vacuum at 60° C. for 4 h to obtain a powdery solid main catalyst in a spherical shape with good fluidity, non-stickiness to the walls of the container, and uniform particle size distribution.

Example 12

This example provides a method for preparing a main catalyst of an olefin coordination polymerization catalyst, which specifically comprises the following steps:

In a reactor sufficiently purged with nitrogen, 1 g of magnesium dichloride, 40 mL of n-decane, and 2.5 mL of ethanol were added, and the mixture was stirred, heated to 100° C., and reacted for 2 h. The temperature was lowered to 60° C., and 1.5 g of an electron-donating star-shaped organosiloxane compound (Structural Formula 12) and 8 mL of tetraethoxysilane were added, and the reaction was carried out for 2 h with the temperature kept at 60° C. The temperature was lowered to 15° C., 35 mL of titanium tetrachloride at −15° C. was then added dropwise, the reaction was carried out for 1 h at −15° C., then the temperature was raised to 120° C. in 3 h, and the reaction was carried out for 2 h. Stirring was stopped, and the reaction mixture was allowed to stand, separated in layers, filtered, washed four times with hexane (30 ml each time), and dried under vacuum at 50° C. for 4 h to obtain a powdery solid main catalyst in a spherical shape with good fluidity, non-stickiness to the walls of the container, and uniform particle size distribution.

Example 13

This example provides a method for preparing a main catalyst of an olefin coordination polymerization catalyst, which specifically comprises the following steps:

In a reactor sufficiently purged with nitrogen, 1 g of magnesium dichloride, 20 mL of n-decane, and 3 mL of isooctanol were added, and the mixture was stirred, heated to 110° C., and reacted for 3 h. The temperature was lowered to 50° C., and 1.5 g of an electron-donating star-shaped organosiloxane compound (Structural Formula 13) was added, and the reaction was carried out for 2 h at 50° C. The temperature was lowered to 0° C., 25 mL of titanium tetrachloride was then added dropwise, the reaction was carried out for 1 h, then the temperature was raised to 110° C., and the reaction was carried out for 2 h. Stirring was stopped, and the reaction mixture was allowed to stand, separated in layers, filtered, washed twice with hexane (30 ml each time), and dried under vacuum at 50° C. for 4 h to obtain a powdery solid main catalyst in a spherical shape with good fluidity, non-stickiness to the walls of the container, and uniform particle size distribution.

Example 14

This example provides a method for preparing a main catalyst of an olefin coordination polymerization catalyst, which specifically comprises the following steps:

In a reactor sufficiently purged with nitrogen, 1 g of magnesium dichloride, 20 mL of n-decane, 10 mL of toluene, 2 mL of ethanol, and 6.5 mL of isooctanol were added, and the mixture was stirred, heated to 100° C., and reacted for 4 h. The temperature was lowered to 40° C., 2 g of an electron-donating star-shaped organosiloxane compound (Structural Formula 14) and 0.15 g of silica gel were added, and the temperature was raised to 70° C. and the reaction was carried out for 2 h. The temperature was lowered to −15° C., 15 mL of titanium tetrachloride was then added dropwise, the reaction was carried out for 1 h, then the temperature was raised to 95° C., and the reaction was carried out for 2 h. Stirring was stopped, and the reaction mixture was allowed to stand, separated in layers, filtered, washed twice with hexane (30 ml each time), and dried under vacuum at 60° C. for 2 h to obtain a powdery solid main catalyst in a spherical shape with good fluidity, non-stickiness to the walls of the container, and uniform particle size distribution.

Example 15

This example provides a method for preparing a main catalyst of an olefin coordination polymerization catalyst, which specifically comprises the following steps:

In a reactor sufficiently purged with nitrogen, 1 g of magnesium dichloride, 30 mL of n-decane, 6.5 mL of isooctanol, and 0.25 mL of ethanol were added, and the mixture was stirred, heated to 120° C., and reacted for 2 h. The temperature was lowered to 50° C., 3 g of an electron-donating star-shaped organic heteroether compound (Structural Formula 15) and 15 mL of succinate were added, and the reaction was carried out for 3 h with the temperature kept at 50° C. The temperature was lowered to −15° C., 20 mL of titanium tetrachloride was then added dropwise, the reaction was carried out for 1 h, then the temperature was raised to 90° C., and the reaction was carried out for 2 h. The reaction mixture was dried under vacuum at 60° C. for 2 h to obtain a powdery solid main catalyst in a spherical shape with good fluidity, non-stickiness to the walls of the container, and uniform particle size distribution.

Example 16

This example provides a method for preparing a main catalyst of an olefin coordination polymerization catalyst, which specifically comprises the following steps:

In a reactor sufficiently purged with nitrogen, 1 g of magnesium dichloride, 20 mL of n-decane, 10 mL of toluene, 2 mL of ethanol, and 6.5 mL of isooctanol were added, and the mixture was stirred, heated to 100° C., and reacted for 4 h. The temperature was lowered to 40° C., 6 g of an electron-donating star-shaped organic heteroether compound (Structural Formula 16) was added, and the temperature was raised to 90° C. and the reaction was carried out for 2 h. The temperature was lowered to −15° C., 25 mL of titanium tetrachloride was then added dropwise, the reaction was carried out for 1 h, then the temperature was raised to 120° C., and the reaction was carried out for 2 h. Stirring was stopped, and the reaction mixture was allowed to stand, separated in layers, filtered, washed twice with hexane (30 ml each time), and dried under vacuum at 60° C. for 2 h to obtain a powdery solid main catalyst in a spherical shape with good fluidity, non-stickiness to the walls of the container, and uniform particle size distribution.

Example 17

This example provides a method for preparing a main catalyst of an olefin coordination polymerization catalyst, which specifically comprises the following steps:

In a reactor sufficiently purged with nitrogen, 1 g of magnesium dichloride, 20 mL of n-decane, 20 mL of toluene, 2 mL of ethanol, and 7 mL of isooctanol were added, and the mixture was stirred, heated to 100° C., and reacted for 4 h. The temperature was lowered to 60° C., 2.5 g of an electron-donating star-shaped organic heteroether compound (Structural Formula 17) and 0.05 mL of tetraethoxysilane were added, and the temperature was raised to 70° C. and the reaction was carried out for 2 h. The temperature was lowered to −15° C., 25 mL of titanium tetrachloride was then added dropwise, the reaction was carried out for 1 h, then the temperature was raised to 110° C., and the reaction was carried out for 2 h. Stirring was stopped, and the reaction mixture was allowed to stand, separated in layers, filtered, washed twice with hexane (30 ml each time), and dried under vacuum at 60° C. for 2 h to obtain a powdery solid main catalyst in a spherical shape with good fluidity, non-stickiness to the walls of the container, and uniform particle size distribution.

Example 18

This example provides a method for preparing a main catalyst of an olefin coordination polymerization catalyst, which specifically comprises the following steps:

In a reactor sufficiently purged with nitrogen, 1 g of magnesium dichloride and 30 mL of n-hexane were added, and the mixture was stirred, heated to 80° C., and reacted for 4 h. The temperature was lowered to 60° C., 5.5 g of an electron-donating star-shaped organic heteroether compound (Structural Formula 18) was added, and the temperature was raised to 80° C. and the reaction was carried out for 2 h. The temperature was lowered to −15° C., 25 mL of titanium tetrachloride was then added dropwise, the reaction was carried out for 1 h, then the temperature was raised to 100° C., and the reaction was carried out for 2 h. Stirring was stopped, and the reaction mixture was allowed to stand, separated in layers, filtered, washed twice with hexane (30 ml each time), and dried under vacuum at 60° C. for 2 h to obtain a powdery solid main catalyst in a spherical shape with good fluidity, non-stickiness to the walls of the container, and uniform particle size distribution.

Example 19

This example provides a method for preparing a main catalyst of an olefin coordination polymerization catalyst, which specifically comprises the following steps:

In a reactor sufficiently purged with nitrogen, 1 g of magnesium dichloride, 30 mL of cyclohexane, 6 mL of isooctanol, and 0.25 mL of ethanol were added, and the mixture was stirred, heated to 100° C., and reacted for 2 h. The temperature was lowered to 60° C., 4.5 g of an electron-donating star-shaped organic heteroether compound (Structural Formula 19) was added, and the temperature was raised to 80° C. and the reaction was carried out for 4 h. The temperature was lowered to −15° C., 25 mL of titanium tetrachloride was then added dropwise, the reaction was carried out for 1 h, then the temperature was raised to 110° C., and the reaction was carried out for 2 h. Stirring was stopped, and the reaction mixture was allowed to stand, separated in layers, filtered, washed twice with cyclohexane (30 ml each time) and twice with hexane (30 ml each time), and dried under vacuum at 80° C. for 2 h to obtain a powdery solid main catalyst in a spherical shape with good fluidity, non-stickiness to the walls of the container, and uniform particle size distribution.

Comparative Example 1

This comparative example provides a method for preparing a main catalyst of an olefin coordination polymerization catalyst, which specifically comprises the following steps:

In a reactor sufficiently purged with nitrogen, 1 g of diethoxymagnesium, 20 mL of decane, 6 mL of isooctanol, and 0.25 mL of ethanol were added, and the mixture was stirred, heated to 100° C., and reacted for 2 h. The temperature was lowered to 60° C., 3 mL of tetraethoxysilane was added, and the reaction was carried out for 2 h with the temperature kept at 60° C. The temperature was lowered to −15° C., 25 mL of titanium tetrachloride was then added dropwise, the reaction was carried out for 1 h, then the temperature was raised to 100° C., and the reaction was carried out for 2 h. Stirring was stopped, and the reaction mixture was allowed to stand, separated in layers, filtered, washed four times with hexane (30 ml each time), and dried under vacuum at 80° C. for 2 h to obtain a powdery solid main catalyst in a spherical shape with good fluidity and uniform particle size distribution, although the main catalyst particles tended to adhere to the walls of the container.

Comparative Example 2

This comparative example provides a method for preparing a main catalyst of an olefin coordination polymerization catalyst, which specifically comprises the following steps:

In a reactor sufficiently purged with nitrogen, 1 g of diethoxymagnesium, 20 mL of decane, 6 mL of isooctanol, and 0.25 mL of ethanol were added, and the mixture was stirred, heated to 100° C., and reacted for 2 h. The temperature was lowered to 60° C., 3 mL of tributyl phosphate and 3 mL of tetraethoxysilane were added, and the reaction was carried out for 2 h with the temperature kept at 60° C. The temperature was lowered to −15° C., 25 mL of titanium tetrachloride was then added dropwise, the reaction was carried out for 1 h, then the temperature was raised to 100° C., and the reaction was carried out for 2 h. Stirring was stopped, and the reaction mixture was allowed to stand, separated in layers, filtered, washed twice with hexane (30 ml each time), and dried under vacuum at 60° C. for 2 h to obtain a powdery solid main catalyst, although the main catalyst particles tended to adhere to the walls of the container.

Comparative Example 3

This comparative example provides a method for preparing a main catalyst of an olefin coordination polymerization catalyst, which specifically comprises the following steps:

In a reactor sufficiently purged with nitrogen, 1 g of diethoxymagnesium, 20 mL of decane, 6 mL of isooctanol, and 0.25 mL of ethanol were added, and the mixture was stirred, heated to 100° C., and reacted for 2 h. The temperature was lowered to 60° C., 3 mL of tributyl phosphate was added, and the reaction was carried out for 2 h with the temperature kept at 60° C. The temperature was lowered to −15° C., 25 mL of titanium tetrachloride was then added dropwise, the reaction was carried out for 1 h, then the temperature was raised to 100° C., and the reaction was carried out for 2 h. Stirring was stopped, and the reaction mixture was allowed to stand, separated in layers, filtered, washed twice with hexane (30 ml each time), and dried under vacuum at 60° C. for 2 h to obtain a powdery solid main catalyst, but the main catalyst particles tended to adhere to the walls of the container.

Application Example 1

Ethylene polymerization: after a 2 liter stainless steel autoclave was sufficiently purged with nitrogen, 1 mg of the main catalyst, 1000 mL of dehydrated hexane, and 1.5 mL of an $AlEt_3$ solution (2 mmol/mL) as a cocatalyst were sequentially added to the autoclave, and the temperature was raised to 75° C. before hydrogen was charged to 0.28 MPa and ethylene was further charged to 0.73 MPa. The reaction was carried out under constant pressure at a constant temperature for 2 h. The result of olefin polymerization is shown in Table 1.

Application Example 2

Ethylene copolymerization: after a 2 liter stainless steel autoclave was sufficiently purged with nitrogen, 10 mg of the main catalyst, 1000 mL of dehydrated hexane, and 1.5 mL of $AlEt_3$ solution (2 mmol/mL) were sequentially added to the autoclave, and 30 mL of 1-hexene was added, and the temperature was raised to 75° C. Then 0.28 MPa of hydrogen was charged, and ethylene was charged to 0.73 MPa. The reaction was carried out under constant pressure at a constant temperature for 2 h. The result of olefin polymerization is shown in Table 1.

Application Example 3

Propylene polymerization: after a 2 liter stainless steel autoclave was sufficiently purged with nitrogen, 10 mg of the main catalyst, 1000 mL of dehydrated hexane, and 1.5 mL of $AlEt_3$ solution (2 mmol/mL) were sequentially added to the autoclave, 4 mL of electron-donating triethoxycyclopentyloxysilane (a 0.18 M solution in hexane), and the temperature was raised to 80° C. Then 0.1 MPa of hydrogen was charged, and propylene was charged to 3 MPa. The reaction was carried out under constant pressure at a constant temperature for 2 h. The result of olefin polymerization is shown in Table 1.

Example 20

This example provides a method for preparing a main catalyst of an olefin coordination polymerization catalyst, which specifically comprises the following steps:

In a reactor sufficiently purged with nitrogen, 1 g of magnesium dichloride, 20 mL of n-decane, 2.5 mL of ethanol, and 6.5 mL of isooctanol were added, and the mixture was stirred, heated to 120° C., and reacted for 3 h. The temperature was lowered to 60° C., and 2 g of an electron-donating star-shaped organosiloxane compound (Structural Formula 3) and 0.2 mL of tetraethoxysilane were added, and the reaction was carried out for 2 h with the temperature kept at 60° C. The temperature was lowered to −5° C., 35 mL of titanium tetrachloride was added dropwise, the reaction was carried out for 1 h; then the temperature was raised to 110° C. in 4 h, and the reaction was carried out for 2 h. Stirring was stopped, and the reaction mixture was allowed to stand, separated in layers, filtered, washed four times with hexane (30 ml each time), and dried under vacuum at 50° C. for 4 h to obtain a powdery solid main catalyst in a spherical shape with good fluidity, non-stickiness to the walls of the container, and uniform particle size distribution.

Ethylene Polymerization

After a 2 liter stainless steel autoclave was sufficiently purged with nitrogen, 5 mg of the above-mentioned main catalyst of the present example, 1000 mL of dehydrated hexane, 0.6 mL of an AlEt$_3$ solution (2 mmol/mL) as a cocatalyst were sequentially added to the autoclave, and the temperature was raised to 70° C. before hydrogen was charged to 0.1 MPa and ethylene was further charged to 0.8 MPa. The reaction was carried out under constant pressure at a constant temperature for 1 h.

375.2 g of polyethylene was obtained, with a bulk density BD=0.34 and a melt index MFR=0.1 g/10 min.

After a 2 liter stainless steel autoclave was sufficiently purged with nitrogen, 10 mg of the main catalyst, 1000 mL of dehydrated hexane, 0.6 mL of an AlEt$_3$ solution (2 mmol/mL) as a cocatalyst were sequentially added to the autoclave, and the temperature was raised to 70° C. before hydrogen was charged to 0.28 MPa and ethylene was further charged to 0.73 MPa. The reaction was carried out under constant pressure at a constant temperature for 2 h.

355.5 g of polyethylene was obtained, with a bulk density BD=0.34 and a melt index MFR=1.6 g/10 min.

After a 2 liter stainless steel autoclave was sufficiently purged with nitrogen, 25 mg of the above-mentioned main catalyst of the present example, 1000 mL of dehydrated hexane, 3.0 mL of a AlEt$_3$ solution (2 mmol/mL) as a cocatalyst were sequentially added to the autoclave, and the temperature was raised to 70° C. before hydrogen was charged to 0.73 MPa and ethylene was further charged to 1.0 MPa. The reaction was carried out under constant pressure at a constant temperature for 1 h. 263.6 g of polyethylene was obtained, with a bulk density BD=0.35 and a melt index MFR=480 g/10 min.

Example 21

This example provides a method for preparing a main catalyst of an olefin coordination polymerization catalyst, which specifically comprises the following steps:

In a reactor sufficiently purged with nitrogen, 1 g of magnesium dichloride, 20 mL of n-decane, 2.5 mL of ethanol, and 6.5 mL of isooctanol were added, and the mixture was stirred, heated to 120° C., and reacted for 3 h. The temperature was lowered to 60° C., and 1.2 g of an electron-donating star-shaped organosiloxane compound (1) and 0.2 mL of tetraethoxysilane were added, and the reaction was carried out for 2 h with the temperature kept at 60° C. The temperature was lowered to 25° C., 25 mL of titanium tetrachloride at −15° C. was added dropwise, the reaction was carried out for 1 h at 0° C., then the temperature was raised to 110° C. in 4 h, and the reaction was carried out for another 2 h. Stirring was stopped, and the reaction mixture was allowed to stand, separated in layers, filtered, washed four times with hexane (30 ml each time), and dried under vacuum at 50° C. for 4 h to obtain a powdery solid main catalyst in a spherical shape with good fluidity, non-stickiness to the walls of the container, and uniform particle size distribution.

Ethylene Polymerization

After a 2 liter stainless steel autoclave was sufficiently purged with nitrogen, 5 mg of the above-mentioned main catalyst of the present example, 1000 mL of dehydrated hexane, 0.6 mL of an AlEt$_3$ solution (2 mmol/mL) as a cocatalyst were sequentially added to the autoclave, and the temperature was raised to 70° C. before hydrogen was charged to 0.1 MPa and ethylene was further charged to 0.6 MPa. The reaction was carried out under constant pressure at a constant temperature for 1 h.

285.3 g of polyethylene was obtained, with a bulk density BD=0.33 and a melt index MFR=0.18 g/10 min.

After a 2 liter stainless steel autoclave was sufficiently purged with nitrogen, 10 mg of the above-mentioned main catalyst of the present example, 1000 mL of dehydrated hexane, 0.6 mL of an AlEt$_3$ solution (2 mmol/mL) as a cocatalyst were sequentially added to the autoclave, and the temperature was raised to 70° C. before hydrogen was charged to 0.28 MPa and ethylene was further charged to 0.73 MPa. The reaction was carried out under constant pressure at a constant temperature for 2 h.

361.3 g of polyethylene was obtained, with a bulk density BD=0.33 and a melt index MFR=1.7 g/10 min.

After a 2 liter stainless steel autoclave was sufficiently purged with nitrogen, 25 mg of the main catalyst, 1000 mL of dehydrated hexane, 3.0 mL of an AlEt$_3$ solution (2 mmol/mL) as a cocatalyst were sequentially added to the autoclave, and the temperature was raised to 70° C. before hydrogen was charged to 0.73 MPa and ethylene was further charged to 1.0 MPa. The reaction was carried out under constant pressure at a constant temperature for 1 h.

258.1 g of polyethylene was obtained, with a bulk density BD=0.34 and a melt index MFR=490 g/10 min.

Comparative Example 4

This comparative example provides a method for preparing a main catalyst of an olefin coordination polymerization catalyst, which specifically comprises the following steps:

In a reactor sufficiently purged with nitrogen, 1 g of magnesium dichloride, 20 mL of n-decane, 6.5 mL of isooctanol, and 2.5 mL of ethanol were added, and the mixture was stirred, heated to 120° C., and reacted for 3 h. The temperature was lowered to 60° C., and 0.2 mL of tetraethoxysilane were added, and the reaction was carried out for 2 h with the temperature kept at 60° C. The temperature was lowered to 25° C., 25 mL of titanium tetrachloride at −15° C. was added dropwise, the reaction was carried out for 1 h at 0° C.; then the temperature was raised to 110° C. in 4 h, and the reaction was carried out for another 2 h. Stirring was stopped, and the reaction mixture was allowed to stand, separated in layers, filtered, washed four times with hexane (30 ml each time), and dried under vacuum at 50° C. for 4 h to obtain a powdery solid main catalyst in a spherical shape with good fluidity and uniform particle size distribution, although the main catalyst particles tended to adhere to the walls of the container.

Ethylene Polymerization

After a 2 liter stainless steel autoclave was sufficiently purged with nitrogen, 10 mg of the above-mentioned main catalyst, 1000 mL of dehydrated hexane, 0.6 mL of an $AlEt_3$ solution (2 mmol/mL) as a cocatalyst were sequentially added to the autoclave, and the temperature was raised to 70° C. before hydrogen was charged to 0.1 MPa and ethylene was further charged to 0.8 MPa. The reaction was carried out under constant pressure at a constant temperature for 1 h.

235.3 g of polyethylene was obtained, with a bulk density BD=0.30 and a melt index MFR=0.3 g/10 min.

After a 2 liter stainless steel autoclave was sufficiently purged with nitrogen, 10 mg of the main catalyst, 1000 mL of dehydrated hexane, 0.6 mL of an $AlEt_3$ solution (2 mmol/mL) as a cocatalyst were sequentially added to the autoclave, and the temperature was raised to 70° C. before hydrogen was charged to 0.28 MPa and ethylene was further charged to 0.73 MPa. The reaction was carried out under constant pressure at a constant temperature for 2 h.

188.3 g of polyethylene was obtained, with a bulk density BD=0.28 and a melt index MFR=3.1 g/10 min.

After a 2 liter stainless steel autoclave was sufficiently purged with nitrogen, 50 mg of the main catalyst, 1000 mL of dehydrated hexane, 3.0 mL of an $AlEt_3$ solution (2 mmol/mL) as a cocatalyst were sequentially added to the autoclave, and the temperature was raised to 70° C. before hydrogen was charged to 0.73 MPa and ethylene was further charged to 1.0 MPa. The reaction was carried out under constant pressure at a constant temperature for 1 h.

172.1 g of polyethylene was obtained, with a bulk density BD=0.26 and a melt index MFR=126 g/10 min.

TABLE 1

| Examples | Titanium content in the main catalyst (wt %) | Catalytic efficiency in Application Example 1 (kg/g cat) | Catalytic efficiency in Application Example 2 (kg/g cat) | Catalytic efficiency of Application Example 3 (kg/g cat) | Bulk density (g/cm³) |
|---|---|---|---|---|---|
| 1 | 5.0 | 28 | 30 | — | 0.34 |
| 2 | 4.8 | 29 | 31 | — | 0.33 |
| 3 | 5.1 | 27 | 26 | — | 0.34 |
| 4 | 5.2 | 28 | 28 | — | 0.34 |
| 5 | 5.3 | 27 | 27 | — | 0.35 |
| 6 | 5.2 | 29 | 30 | — | 0.33 |
| 7 | 4.8 | 27 | 29 | — | 0.32 |
| 8 | 4.8 | 27 | 24 | — | 0.31 |
| 9 | 5.1 | 24 | 28 | — | 0.32 |
| 10 | 4.7 | 25 | 26 | — | 0.33 |
| 11 | 4.8 | 27 | 28 | — | 0.33 |
| 12 | 4.9 | 25 | 25 | — | 0.32 |
| 13 | 5.3 | 24 | 24 | — | 0.33 |
| 14 | 5.2 | 24 | 22 | — | 0.31 |
| 15 | 3.8 | — | — | 33 | 0.47 |
| 16 | 5.2 | 24 | 25 | — | 0.32 |
| 17 | 5.1 | 25 | 26 | — | 0.36 |
| 18 | 5.0 | 27 | 28 | — | 0.40 |
| 19 | 4.9 | 25 | 26 | — | 0.35 |
| Comparative Example 1 | 5.0 | 19 | 20 | — | 0.28 |
| Comparative Example 2 | 5.1 | 18 | 21 | — | 0.26 |
| Comparative Example 3 | 5.1 | 20 | 20 | — | 0.29 |

The above examples demonstrate that the olefin coordination polymerization catalyst of the present invention has a high catalytic activity and a simple preparation process.

The invention claimed is:

1. An olefin coordination polymerization catalyst, characterized in that the composition of the raw materials of the olefin coordination polymerization catalyst comprises: a solid main catalyst and a cocatalyst, wherein a molar ratio of the transition metal halide in the solid main catalyst to the cocatalyst is 1: 10-500;

the composition of the raw materials of the solid main catalyst comprises a magnesium compound, a transition metal halide, an alcohol having 2 to 15 carbon atoms, and a star-shaped organosiloxane compound in a molar ratio of 1:1-40:0.01-10:0.001-10; the cocatalyst comprises an organoaluminum compound;

the star-shaped organosiloxane compound is at least one selected from the group consisting of the compounds of the Formula (I):

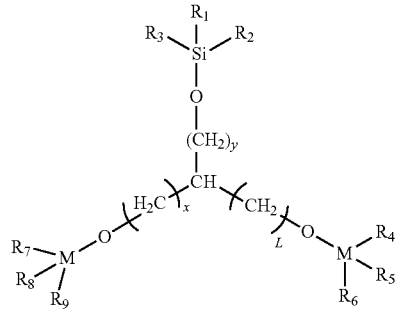

Formula (I)

wherein y, x and L are integers selected from 0, 1-15;
M is Si;
$R_1$, $R_2$, and $R_3$ are organic groups, present simultaneously or not simultaneously, selected from H, $C_1$-$C_{20}$ aliphatic hydrocarbyl, $C_1$-$C_{20}$ alkoxy, $C_3$-$C_{20}$ alicyclic group, $C_3$-$C_{20}$ alicyclic alkoxy, $C_6$-$C_{20}$ aryloxy, or $C_6$-$C_{20}$ aromatic hydrocarbyl;
$R_4$, $R_5$, and $R_6$ are organic groups, present simultaneously or not simultaneously, selected from H, $C_1$-$C_{20}$ aliphatic hydrocarbyl, $C_1$-$C_{20}$ alkoxy, $C_3$-$C_{20}$ alicyclic group, $C_3$-$C_{20}$ alicyclic alkoxy, $C_6$-$C_{20}$ aryloxy, or $C_6$-$C_{20}$ aromatic hydrocarbyl;
$R_7$, $R_8$, and $R_9$ are organic groups, present simultaneously or not simultaneously, selected from H, $C_1$-$C_{20}$ aliphatic hydrocarbyl, $C_1$-$C_{20}$ alkoxy, $C_3$-$C_{20}$ alicyclic group, $C_3$-$C_{20}$ alicyclic alkoxy, $C_6$-$C_{20}$ aryloxy, or $C_6$-$C_{20}$ aromatic hydrocarbyl,
wherein the solid main catalyst of the olefin coordination polymerization catalyst is prepared by the method comprising:
dispersing the magnesium compound in an inert organic solvent, into which an alcohol having 2-15 carbon atoms is added, and stirring at 90° C. to 150° C. for 1 hour-5 hours;
lowering the temperature to 30° C. to 80° C., and adding the star-shaped organosiloxane compound, and carrying out the reaction for 0.5 hour-3 hours to obtain a mixture;
contacting the mixture with the transition metal halide at −25° C. to 30° C., reacting at −25° C. to 30° C. for 0.5 h-5 hours, heating to 50° C. to 120° C. in 2 hours-8 hours, and reacting for 0.5 h-5 hours;

washing the product with toluene or n-hexane, filtering and drying under vacuum at 40° C. to 90° C. for 0.5 h-5 hours to obtain the solid main catalyst of the olefin coordination polymerization catalyst.

2. The olefin coordination polymerization catalyst according to claim 1, wherein the star-shaped organosiloxane compound is at least one selected from the compounds represented by the following structural formulae:

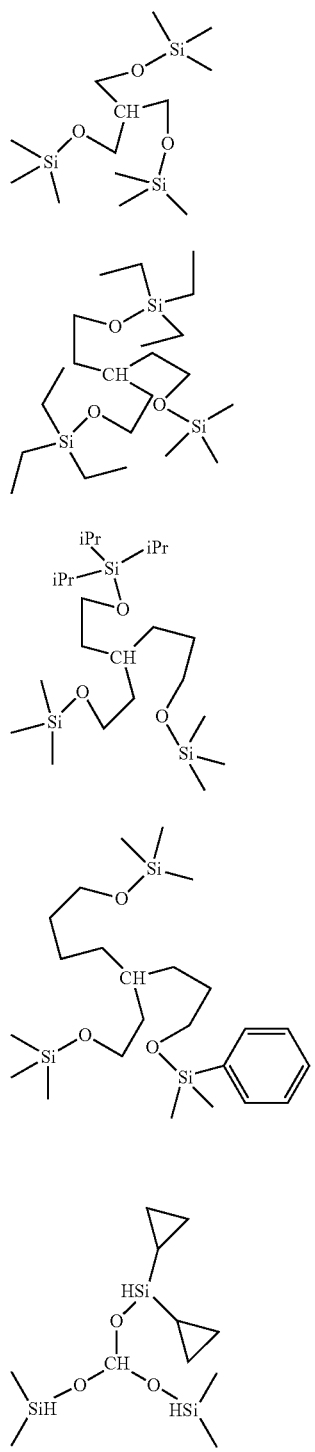
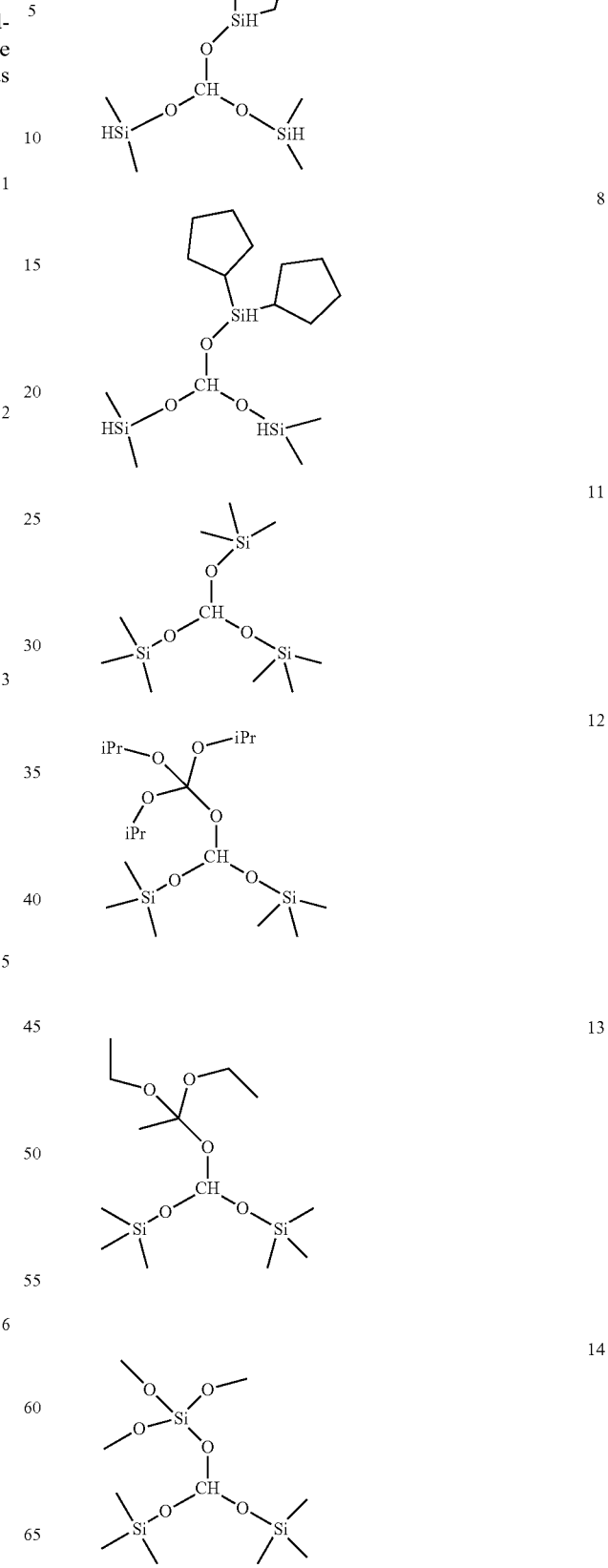

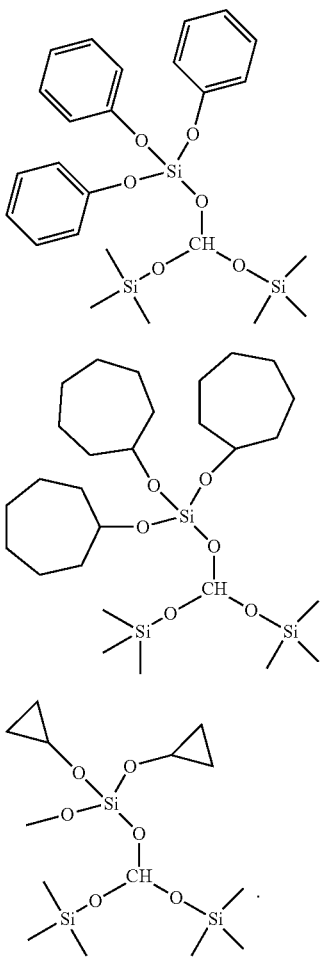

3. The olefin coordination polymerization catalyst according to claim 1, wherein the magnesium compound is at least one selected from compounds of formula $Mg(R)_aX_b$, wherein R is selected from $C_1$-$C_{20}$ aliphatic hydrocarbyl, $C_1$-$C_{20}$ aliphatic alkoxy, $C_3$-$C_{20}$ alicyclic group, or $C_6$-$C_{20}$ aromatic hydrocarbyl; X is selected from halogen; a=0, 1 or 2; b=0, 1 or 2, and a+b=2.

4. The olefin coordination polymerization catalyst according to claim 1, wherein the magnesium compound includes at least one selected from magnesium dichloride, magnesium dibromide, magnesium diiodide, magnesium methoxide chloride, magnesium ethoxide chloride, magnesium propoxide chloride, magnesium butoxide chloride, magnesium phenoxide chloride, magnesium ethoxide, magnesium isopropoxide, magnesium butoxide, magnesium isopropoxide chloride, butyl magnesium chloride, magnesium diethoxide, magnesium dipropoxide, and magnesium dibutoxide.

5. The olefin coordination polymerization catalyst according to claim 4, wherein the magnesium compound is magnesium dichloride, magnesium diethoxide, or magnesium dipropoxide.

6. The olefin coordination polymerization catalyst according to claim 1, wherein the transition metal halide is at least one selected from a compound of formula $M(R^{14})_{4-m}X_m$, wherein M is Ti, Zr, Hf, Fe, Co, or Ni; X is Cl, Br, or F; m is an integer from 1 to 4; $R^{14}$ is selected from $C_1$-$C_{20}$ aliphatic hydrocarbyl, $C_1$-$C_{20}$ aliphatic alkoxy, $C_1$-$C_{20}$ cyclopentadienyl group, $C_1$-$C_{20}$ aromatic hydrocarbyl, COR', or COOR', wherein R' is an aliphatic hydrocarbyl having $C_1$-$C_{10}$ or an aromatic group having $C_1$-$C_{10}$.

7. The olefin coordination polymerization catalyst according to claim 6, wherein $R^{14}$ includes methyl, ethyl, propyl, butyl, pentyl, hexyl, heptyl, octyl, nonyl, decyl, isobutyl, tert-butyl, isopentyl, tert-pentyl, 2-ethylhexyl, phenyl, naphthyl, o-methylphenyl, m-methylphenyl, p-methylphenyl, o-sulfonylphenyl, formyl, acetyl, or benzoyl.

8. The olefin coordination polymerization catalyst according to claim 6, wherein the transition metal halide is one or a combination of more than one of titanium tetrachloride, titanium tetrabromide, titanium tetraiodide, titanium tetrabutoxide, titanium tetraethoxide, titanium monochloride triethoxide, titanium dichloride diethoxide, titanium trichloride ethoxide, n-butyl titanate, isopropyl titanate, titanium methoxide trichloride, titanium dibutoxide dichloride, titanium tributoxide chloride, titanium tetraphenoxide, titanium monochloride triphenoxide, titanium dichloride diphenoxide, and titanium trichloride monophenoxide.

9. The olefin coordination polymerization catalyst according to claim 8, wherein the transition metal halide is titanium tetrachloride; and a molar ratio of the transition metal halide to the magnesium compound is 8-40:1.

10. The olefin coordination polymerization catalyst according to claim 1, wherein the alcohol having 2 to 15 carbon atoms is at least one selected from ethanol, methanol, propanol, butanol, pentanol, heptanol, isooctanol, n-octanol, nonanol, decanol, undecanol, dodecanol, tridecanol, tetradecanol, and pentadecanol.

11. The olefin coordination polymerization catalyst according to claim 10, wherein the alcohol having 2 to 15 carbon atoms is at least one of ethanol and isooctanol.

12. A method for polymerization of ethylene, propylene or copolymerization of ethylene or propylene with an α-olefin, comprising using the olefin coordination polymerization catalyst according to claim 1; wherein the α-olefin is selected from $C_3$-$C_{20}$ olefins.

13. The method according to claim 12, wherein the α-olefin is selected from propylene, 1-butene, 1-hexene, 1-octene, 1-decene, 3-methyl-1-butene, cyclopentene, 4-methyl-1-pentene, 1,3-butadiene, isoprene, styrene, methylstyrene, or norbornene.

* * * * *